United States Patent [19]

Frey

[11] 4,064,754
[45] Dec. 27, 1977

[54] METHOD FOR MEASURING THE FILLING LEVEL IN CONTAINERS AND APPARATUS FOR PERFORMING THE METHOD

[75] Inventor: Markus Frey, Zurich, Switzerland

[73] Assignee: ITO-Patent AG, Zurich, Switzerland

[21] Appl. No.: 755,270

[22] Filed: Dec. 29, 1976

[51] Int. Cl.² ........................ G01F 23/10; G01F 23/12
[52] U.S. Cl. ...................................... 73/313; 73/432 L
[58] Field of Search ...................... 73/290 R, 293, 305, 73/313, 319

[56] References Cited

U.S. PATENT DOCUMENTS

| | | | |
|---|---|---|---|
| 2,771,774 | 11/1956 | Fornasieri | 73/313 |
| 3,314,292 | 4/1967 | Schulte | 73/290 R |

OTHER PUBLICATIONS

Stevenson, Review of Scientific Instruments, May 1965, p. 704.

*Primary Examiner*—S. Clement Swisher
*Attorney, Agent, or Firm*—W. G. Fasse; W. W. Roberts

[57] ABSTRACT

In a method and apparatus for determining the level of liquid in a container, a vertical gas filled tube is provided in the container. The tube is surrounded by a magnetic float. A magnetic follower in the tube follows the vertical position of the magnet float, and serves as the termination point of an optical measuring path between a light source and a detector. An optical reference path also extends from the light source to a second mirror, which may be mounted at a fixed point in the container or on the opposite side of the follower. The system incorporates means for determining the difference in propagation time of light in the two optical paths.

19 Claims, 9 Drawing Figures

METHOD FOR MEASURING THE FILLING LEVEL IN CONTAINERS AND APPARATUS FOR PERFORMING THE METHOD

BACKGROUND OF THE INVENTION:

The invention relates to a method for measuring the filling level in containers by means of electro-optical distance measuring employing the reflected wave principle. Further, the invention relates to an apparatus for performing the method.

Methods for measuring the filling level in containers are known in many modifications. Thus, German Patent Publication (DAS) 10 75 852 discloses a measuring device in which the filling level is ascertained by the observer who must compare two reflected beams by coinciding two images. This coinciding of the two images is accomplished by a mechanical adjustment of the mirror angle on a scale.

According to German Patent Publication (DAS) 11 75 514 a method is known in which light is introduced into the liquid from a light conducting body depending on the filling level in the container. The light quantity which exits at the upper end of the light conducting body represents a measure for the filling level.

Both of the just described devices are not suitable for general applications and are not capable to measure with an exactness which keeps the tolerance to one mm.

German Patent Publication (DOS) 22 08 931 discloses an electro-optical indicator for the ascertaining of the level in containers. The indicator comprises a measuring instrument, as well as means for controlling the current flowing through the instrument as a function of the liquid held in the container. The control means comprise a light source with a constant light or luminous flux as well as a light sensitive element which is influenced by the light source through a bundle of optical fibers, whereby the light flux impinging upon the light sensitive element and travelling through the bundle of optical fibers, is controlled by an indicator or transmitter of the liquid level in the container.

This device, according to German Patent Publication No. 22 08 931, is also not capable of measuring with a 1mm accuracy because this known device is not capable of eliminating error values caused by environmental conditions.

German Patent Publication (DOS) 22 35 329 discloses an arrangement for the exact level measuring in which an optical-electronic measuring device with a digital data output is employed. A closed measuring tube filled with an inert gas is connected to the measuring device. One portion of the measuring tube extends into the container and is connected to the cover member in a force locking manner so that the remaining portions of the measuring pipe extends outside of the container and have degrees of freedom in two axes. A flat ring float with a permanent magnet is arranged around the portion of the measuring tube inside the container. A ball supported measured value indicator is supported by the magnetic field which is established inside the pipe by the ring float. The measured value indicator is provided with a centrally arranged reflector having a pyramid shape.

The apparatus according to German Patent Publication No. 22 35 329 is rather involved in its equipment because of the many inputs and outputs. In addition, disturbing influences which occur as a result of surrounding conditions and which falsify the measurement, are not completely eliminated. A substantial disadvantage of the known apparatus is seen in that the reference point at the bottom of the tank which is necessary for the filling level measurement, cannot be held in a stable condition. In addition, it is necessary that the measuring apparatus itself is precisely fixed and adjusted in its position because each position variation may change the measuring distance from the measuring instrument to the reflector and would thus enter into the measured result. This must be taken into account.

OBJECTS OF THE INVENTION:

In view of the above it is the aim of the invention to achieve the following objects singly or in combination:
to provide a method for measuring the filling level in a container with a 1 mm precision, while employing simple and hence relatively inexpensive equipment;
to minimize the equipment requirements and the procedural steps for the position of the filling level in a container; and
to eliminate the factors which heretofore could falsify the measured results.

SUMMARY OF THE INVENTION:

According to the invention there is provided a method for measuring the filling level in a container by means of electro-optical distance measuring employing the reflector principle, whereby the light path between transmitter and level indicator is, as a matter of principle, divided into one or more reference paths and into a measuring path, wherein the light path either passes through several media, or - where only one media is present - changes its direction, wherein either several measuring beams travel through or measure the reference path in sequence or in parallel, or wherein one divided measuring beam measures the reference path or the reference paths, wherein, at all times, one measuring beam, possibly the only measuring beam or partial beam, ascertains the reference path plus the measuring path, and wherein, the light path or the light paths run at least partially through a light conductor - such as light conducting fibers or pipe systems with mirrors and/or lenses etc. or wherein said light path or paths are changed in their direction by means of light conductor devices such as mirrors, refractive media, and the like.

The just enumerated features achieve a number of advantages as compared to the prior art, for example, the positioning or rather the point where the measuring and evaluating apparatus is located is now dependent only on the range of the equipment and thus substantially independent of the location of the container, the filling level of which is to be measured. Furthermore, it is not necessary to provide an adjustment which takes the positioning or location of the measuring equipment into account. Thus, the mounting requirements have been substantially reduced. In addition, it is now possible according to the invention, to measure the content of several containers by means of a single measuring and evaluating apparatus, whereby the economy of the present method has been substantially increased as compared to prior art methods.

According to the invention, two measuring beams may be employed, one of which contains or travels through the reference path, whereas the other beam contains or travels through the reference path and the measuring paths, whereby it is possible to eliminate all paths except for the true measuring paths by difference formation. This teaching has the advantage, as will be described in more detail below, that variations in the light path which may result from environmental conditions are generally and simply eliminated by employing a few method steps and relatively inexpensive equipment for performing these simple method steps.

According to the invention, there is further provided that one or several measuring beams are transmitted from one or several defined points outside the container through one or several measuring paths to impinge upon one or several reflectors on the outside of the container. In this manner it is possible to take fully into account not only the essential influences which may cause a container deformation and thus a volume change but also to perform a temperature measuring separately of the filling level but in combination therewith and in a quantative manner.

BRIEF FIGURE DESCRIPTION:

In order that the invention may be clearly understood, it will now be described, by way of example, with reference to the accompanying drawings, wherein.

Figures 1A, 1B:
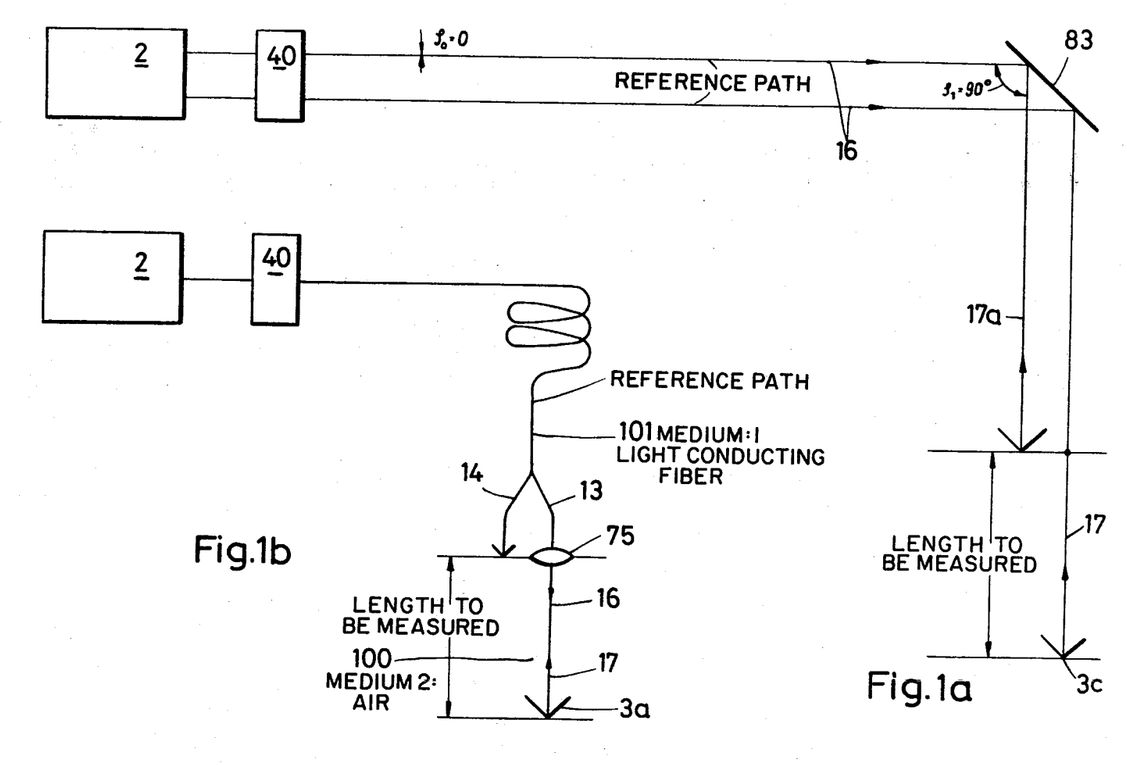
FIG. 1a is a block circuit diagram illustrating the function of the present method and employing a light conductor device including mirrors.
FIG. 1b is a block circuit diagram similar to that of FIG. 1a, but employing light conductor fibers.
Figure 2:
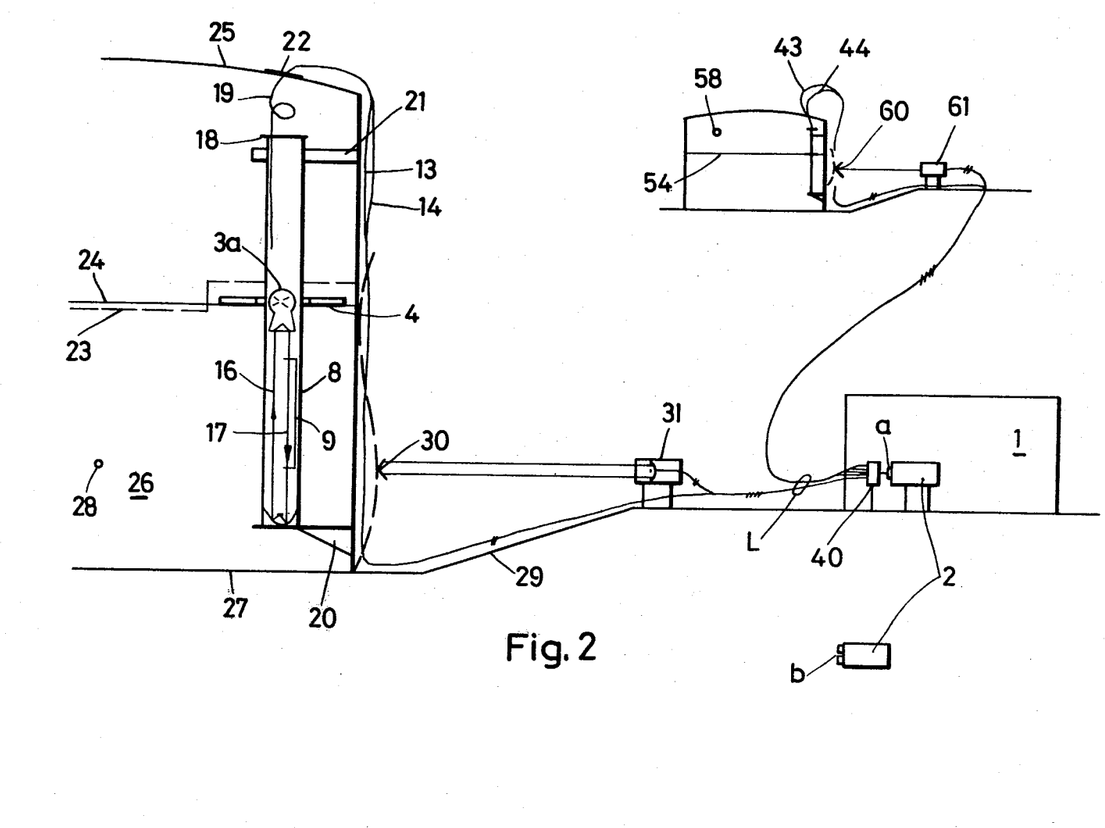
FIG. 2 illustrates schematically the complete structure of an embodiment according to the invention.

DETAILED DESCRIPTION OF PREFERRED EXAMPLE EMBODIMENTS:

FIGS. 1a and 1b show the basic method for ascertaining the measured value by difference formation. FIG. 2 illustrates the complete measuring system in connection with a container storage as they are used in refineries, transit ports, and so forth. The main elements of the entire arrangement are the respective measuring set up at each individual container, the light conductors for leading the radiated light beams and the central distance measuring device and evaluation equipment including an apparatus, for example, as disclosed in U.S. Pat. No. 3,900,260 granted Aug. 19, 1975.

The optical measuring device inside the container comprises a non-magnetic closed pipe 8 which is rigidly connected with the most stable point of the bottom region 20, that is the point which is subjected to the least position variations. Preferably, such a point will be located at the container bottom or at the lower end of the container wall. In this manner an absolute zero point, so to speak, is provided for the measuring of the filling level which has the advantage that an exact correction of other values becomes possible at all, which values might otherwise influence the measured result in an undesirable manner.

The tube 8, preferably does not lead out of the container cover in order to avoid subjecting it to undesirable stresses between the cover and the measuring tube. Further, by avoiding that the measuring tube extends through the container cover, it becomes possible to close the container in an airtight manner. The non-magnetic outer tube 8 comprises a thin pipe 9 of synthetic material the lower end of which leads into a block 10 carrying an optical system 11, 12, for example, a mirror system or a Cassegrainian system. It is the purpose of this system to couple reflected light into a light conductor fiber 13 and to decouple light from the light conductor fiber 13 in accordance with the system requirement. A second light conductor fiber 14 also ends in the block 10. The light conductor 14 operates as a reference fiber and its end is provided with a mirror. Due to the high measuring precision and due to the resulting extreme limit frequencies, the invention uses either fibers of the monomode type or such fibers in which the propagation speed of the light in the direction of the conductor axis is substantially independent of the angle at which the light is coupled into the light conductor. The light conductor fibers 13 and 14 lead into the inside of the tank through a cover element 22 which is closable in an airtight manner whereby the light conductor fibers 13, 14 form an expansion loop 19. For marking the filling level 24 in the container 28, there is arranged a ring float 4 which is freely movable along the outside of the pipe 8. This float 4 comprises strong magnets 6 preferably made of alloys including rare earth metals. These magnets 6 hold a body 3a in a suspended condition inside the tube element 9. The tube element 9 comprises respectively arranged magnets 5a and a stabilizing weight 5b, thus, these elements represent with their position, a direct relationship to the filling level in the container. In order to mark the filling level in the container, the suspended body 3a carries a reflector 7 which reflects the light beams 16 coming from the optical system. The reflected light beams 17 travel through the light conductor 13 to the central measuring and evaluating device 2 where, in a manner known as such, the double distance between the measuring instrument and the reflector are measured. However, since it is desired to ascertain the filling level 24, 54 in the container 28, 58 the double distance between the measuring device 2 and the optical system 11 is measured in a parallel second light conductor 14 as a reference distance which is deducted from the first distance travelled by the light. The difference between the two measurements provide directly twice the filling level height in the container relative to the base or lower end of the measuring tube.

The above described arrangement of the light conductor fibers 13, 14 has the important advantage that all influences to which the light conductors may be subject, for example, changes in length due to temperature influences are eliminated by subtraction. Furthermore, changes in the position of the measuring device do not influence at all the measured value. However, the measured filling level does not yet give a direct information regarding the true content of the tank because there are influencing factors which falsify the calculation of the volume based on the just described filling level measurement. For example, the deformation of the container due to the hydrostatic pressure, due to temperature expansion, and due to loads on the container cover, for example, due to snow loads, may falsify the just mentioned calculation of the container content. Each of these values either alone or in combination with others causes a bulging of the container in accordance with a characteristic function which is theoretically ascertainable. Thus, for the exact calculation of the container volume it is necessary to ascertain such function as well as the size of the disturbances which cause such function.

According to the invention the disturbing values or influences are ascertained by measuring the total bulging of the tanks relative to a zero or reference condition at one point. Such measuring is accomplished by means of an additional optical partial system 31 which is connected through light conductor fibers with the measuring device 2 located in the monitoring station 1. The distribution of the bulging may be measured by taking into account the filling level as well as the hydrostatic pressure in the container. Further, a temperature measurement at the container 28, 58 or inside the container 28, 58 provides information regarding the size of a temperature expansion in the direction of several axes. The deformation resulting from a load on the container cover may then be ascertained from the total bulging and the two other distributed values. The measuring of the temperature may be replaced by an additional measuring of the bulging at a second point on the outer container wall 30, 60.

The measuring device 2 is connected in series with a distributor or light conductor and decoupling device 40 forming an input for the measuring device 2 in order to accommodate light conductors 43, 44 coming from other containers 58. Two embodiments may be provided in this context. In the embodiment B the measuring device 2 cooperates with a number of light conductors 13, 14, 43, 44 which corresponds to the number of containers and which operates as signal inputs and signal outputs 2b. In the embodiment C the measuring device 2 comprises but one input or output 2a which is connected by means of the light switch 40 to the respective light conductor 13, 14, 43, 44 and thus to the containers 28, 58 in a time sharing manner, so to speak.

Figure 3:
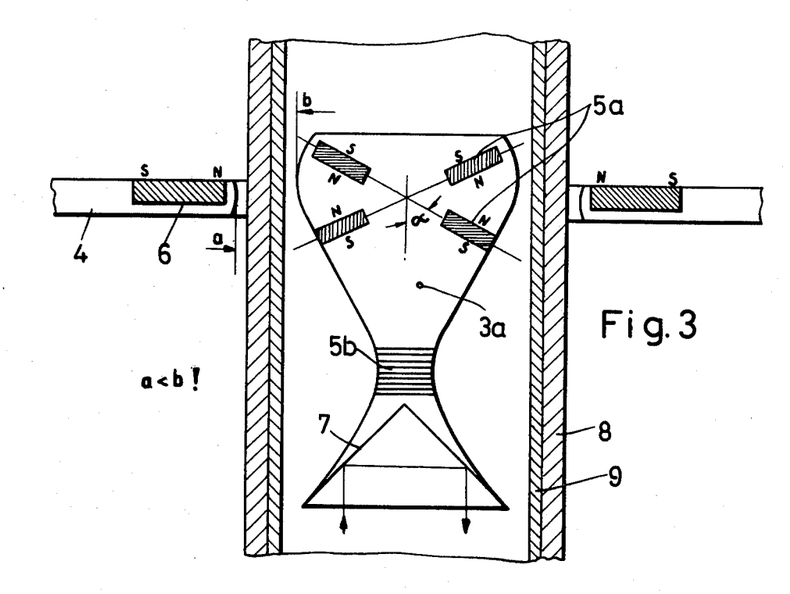
FIG. 3 is a sectional view through the measuring tube with a float system and a filling level indicator or transmitter.

FIG. 3 illustrates the details of the float system which comprises a ring float 4 and a suspended body 3 carrying a reflector 7. The ring float 4 is made of a material of low density such as a styrofoam product or the like. The float 4 is freely movable along the outer pipe 8 up and down thereby eliminating the possibility that wave movement at the top of the liquid level 24, 54, 74, 84 could displace the float 4 laterally. Due to the small specific weight which is substantially less than 1, of the material of the float 4, the latter imerses only very little into the liquid it rather rests on top of the liquid whereby density variations due to temperature changes of the liquid in the container have only a very small effect on the elevational position of the reflector. The maximum of this effect is within the desired measuring accuracy. The strong magnets 6 in the float 4 establish a magnetic field in such a manner that such field reaches into the gaps of the magnetic fields of the two permanent magnets 5a and the suspended body 3 so that the latter is locked in with the field of the magnets 6. In this connection it is essential that only poles of the same polarity of these three magnets face each other. The reflector 7 marks the elevation of the suspended body 3a and thus the height of the liquid level which is then calculated with the aid of the measured phase difference between the light beam reflected by the level indicator or reflector 7 and the reference beam in the optical measuring device 2. Phase difference ascertaining circuits are well known. A stabilizing body 5b makes sure that the position of the poles relative to each other is maintained. Prior art magnetic floats, for example, as described in German Patent Publication (DAS) 11 39 660 have disadvantages insofar as the magnetic field is not as strong in the direction toward the suspended body in the tube due to the arrangement of the float magnets because poles of different polarity face each other in the float. The locking-in of the suspended body which also carries permanent magnets, is accomplished by repulsion rather than attraction. Thus, the equilibrium is accomplished only in a very narrow range. Any occuring tilting moments are compensated by an additional guide rod in the center of the tube. However, this interferes with an optical measurement inside the tube and it even may make such a measurement inside the tube impossible. Another disadvantage of the prior art float is seen in the thickness of the ring float which is necessary due to the arrangement of the magnets. It is not desirable to make the ring float thick instead of using a small suspended body.

The float system according to the invention avoids the just mentioned disadvantages. The embodiment of the float according to the invention works substantially without any friction as compared to floats of the prior art. The thin, light ring float has an optimum movability which is important with regard to a precise and unambiguous ascertaining of the measured values. The suspended body is tightly coupled to the ring float through its two ring fields. Possible oscillations or deflections of the suspended body are dampened due to its field characteristic by a stabilizing member.

Figure 4:
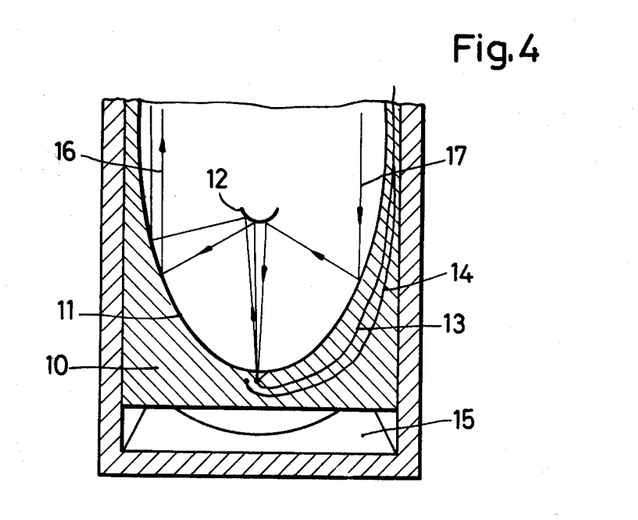
FIG. 4 is a sectional view through the measuring tube with an optical system for the coupling and decoupling of the measuring beams.

FIG. 4 illustrates the optical system as a so called Cassegrainian system. The Cassegrainian system 10 rests on a support 15 on the bottom of the tube 8. Two light conductor fibers 13, 14 lead to the mirror system comprising a large parabolic mirror 11 and a smaller mirror 12 located in the focus of the larger mirror 11. The light conductor fiber 14 comprises a mirror at its end in the block 10, whereby the reference beam is completely reflected. The measuring beam travelling through the second fiber 13 is directed onto the small mirror 12, which widens the measuring beam to project it onto the parabolic mirror 11 which in turn reflects in onto the filling level indicators 3. The Cassegrainian system thus serves for the coupling and decoupling of the measuring light beam in accordance with the system requirements.

Figure 5:
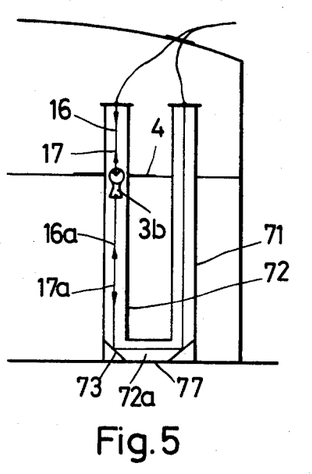
FIG. 5 is an arrangement of a measuring tube constructed as a double tube at the bottom of the container and including a float as well as a filling level indicator or transmitter as well as light conducting fibers.

FIG. 5 illustrates a double tube 71, 72 which is secured to the bottom 77 of the container or at a defined point near the container bottom. The measuring beam and the reference beam are conducted through light conductor fibers which are respectively connected to the upper end of the tube. The light beams 16, 17 and 16a, 17a travel through the pipes 71, 72 which is filled with a gas, preferably with an inert gas. The light beams impinge on the reflector mirrors 73 and thus onto both sides of the filling level indicator 3b which is provided with retroreflectors. The measuring distance is ascertained by subtraction of the two light paths from the measuring device 2 to the two retroreflectors, whereby the ascertained value corresponds to twice the filling level plus the tube cross connection 72a. Instead of the light conductor fibers, it is possible to use other light conductor devices, such as mirror systems or the like.

All arrangements so far described, measure perfect filling levels as far as the certainty of the measuring result is concerned and also with regard to the elimination of environmental influences. Thus, the devices so far described are universally useful, even for containers which comprise a floating roof 23 because the heat expansion of the measuring tube or of the measuring tubes above the roof is elimated from the measured value by subtraction.

The arrangements now to be described do not guarantee exact filling level values, however, these arrangements also constitute useful embodiments of the invention for use where the measuring precision does not play an important part or where other devices cannot be used.

Figure 6:
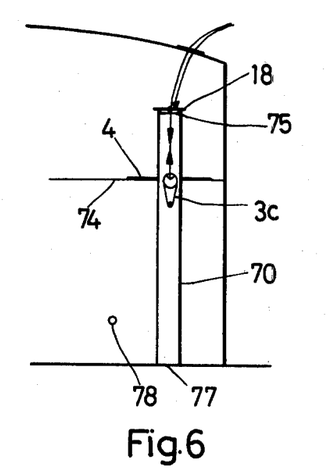
FIG. 6 shows the arrangement of the measuring pipe at the bottom of the container with a float and filling level indicator as well as light conductor fibers.

FIG. 6 illustrates an arrangement useful under these circumstances. A measuring tube 70 is, for example, secured to the tank bottom 77. The two light conductors 13, 14 are connected to the upper edge 18 of the pipe whereby the reference fiber 14 is closed by a mirror at said edge 18. The measuring beam 16 is widened by means of a lens system 75 and lead to the filling level indicator 3c. In addition, the beam is coupled into the fiber 13 from the lens system 75 in accordance with the system requirements.

Figure 7:
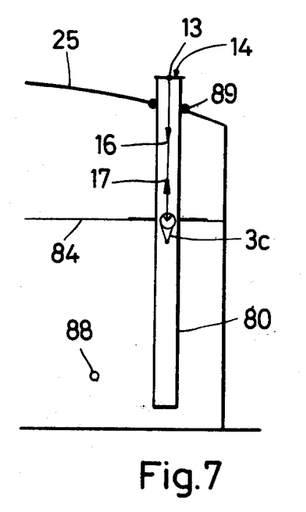
FIG. 7 is the arrangement of the measuring pipe at the container cover with a float and level indicator as well as light conductor fibers.

FIG. 7 shows the same arrangement in a container 88 as shown in the container 78 of FIG. 6, except that the measuring tube 80 is secured to the container cover 25. The connection between tube 80 and cover 25 may not be rigid since the tube must always extend substantially vertically. For this purpose a self aligning or hinged bearing 89 is provided between the tube 80 and the cover 25.

Figure 8:
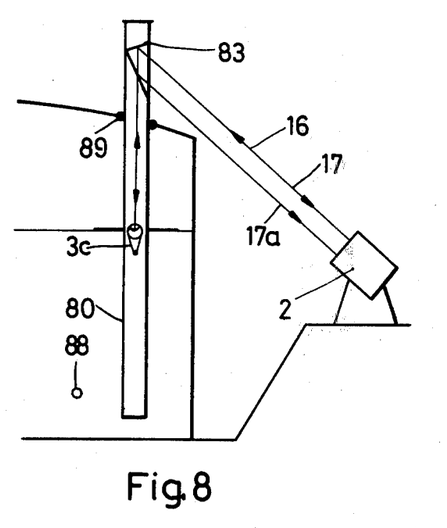
FIG. 8 is an arrangement of the measuring pipe at the container cover with a float and filling level indicator as well as light conductor devices.

FIG. 8 illustrates yet another embodiment in which the measured value is ascertained by means of light conductor devices 83. The measuring tube is also connected through a self aligning bearing 89 to the container cover 25 in a form fitting manner. The upper portion of the tube comprises a mirror system 83 which divides the measuring distance as such or rather the measuring beam into a reference beam and into a measuring beam 17, 17a. The two beams travel through the free atmosphere and the arrangement provides the possibility to eliminate the environmental influences by the formation of the difference between the two beams and supplying the two beams to two active inputs of the measuring device 2. The operation of this arrangement makes it necessary that the electro-optical measuring device is located in a fixed position at a defined point and that the reference paths in the air from the tube to the measuring device are defined and subtractable. The advantage of this method and device shown in FIG. 8 is seen in that several containers may be measured even especially at large distances.

The measuring of the filling level in one or several containers is accomplished as follows. As shown in FIG. 2 the light switch 20 selects from a plurality of light conductors L leading to the individual containers, the light conductor connection to a single container. After this selection, the measuring device 2 transmits a light beam through the selected light conductor L primarily to the tube system 8, 9 in the container 28, 58. The pipe system, depending on the type of arrangement, sends the light beam to the level indicator 3 which represents the liquid level 24 by means of the magnetic float system 3, 4. The indicator 3 reflects the beam and returns it to the measuring device. After a very short period of time, a second beam is transmitted through a parallel light conductor, the so called reference conductor 14, which is reflected at the end of the reference path to be returned to the measuring device 2. The following functions take place in the measuring device 2.

The light beam reflected by the reflector 3 is compared with an internal reference beam in the measuring device in a manner known from the above mentioned U.S. Patent, whereby the distance difference between the two measuring beams is ascertained, said difference corresponding to a value representing twice the distance from the measuring device to the reflector.

A second operation performs substantially the same comparing of the external reference beam 14 which was transmitted to the container on the parallel light path, whereby the length thereof was also ascertained precisely. The filling level is then ascertained in a third procedure which divides the difference between the two measuring beams by two whereby also certain known constants are taken into account depending on the type of system used, for example, the distance between the two bottom mirrors 72a of FIG. 5 is deducted. The reference point for the ascertained filling level measured value is in FIGS. 5 and 6, the bottom 77 of the container or in FIGS. 7 and 8 it is the container cover 25. In this manner, all external influences outside the container, for example, the temperature and so forth which may influence the light path, have been eliminated. In addition, the advantage is achieved that any expansion of the measuring tube, and the temperature expansion of the container does not play any part in the embodiments illustrated in FIGS. 2, 5, and 6 because the reference point is the container bottom.

A further optical measuring system 31, 61 is provided for taking into account the bulging of the container due to the hydrostatic pressure resulting from liquid in the container and/or due to the load of the cover. The additional optical measuring system 31, 61 directly measures the effect of bulging of the outer tank wall in the same manner as described above, whereby the resulting value is supplied as a correction value to the measuring and evaluating device 2.

As illustrated in FIG. 1a and FIG. 1b, the central system 2, which may be of the type disclosed in U.S. Pat. No. 3,900,260, comprises means for measuring the phase difference of light in two paths. The system 2 may thus incorporate a source of light, as well as means for measuring propagation times of light in the respective paths and calculation means, for example, for determining the phase or propagation time differences. In addition, the system 2 may incorporate means for compensating the determined propagation time difference for other effects, such as the bulging effects illustrated with respect to FIG. 2. In this regard, conventional precalculated formulae may be employed, whereby the determined final measuring represents a true measurement of the actual volume of liquid in the container. The relationships employed in such calculations may, also be empirical.

It is of course to be noted that the measurement of the bulging of the tank, as illustrated in FIG. 2, either due to the quantity of liquid in the tank, thermal effects, or top loading effects due to precipatation, may be determined by optical techniques similar to those employed in the measurement of liquid level, i.e., the measuring systems may incorporate reference and measuring paths extending, for example, to the devices 31 and 61, mirrors on the respective tank walls, and optical paths in the air extending between the devices 31 and 61 in the respective mirrors.

In FIGS. 1a and 1b, the light switches 40 have been provided, in order to separate, in time, the measuring in the reference and measuring paths, if this form of difference measuring technique is employed. The light switches 40 may also be incorporated in order to enable the measurement of the liquid level parameters in systems, such as illustrated in FIG. 2, incorporating liquid sensing means in a plurality of different containers.

Although the invention has been described with reference to specific example embodiments, it will be appreciated, that it is intended to cover all modifications and equivalents within the scope of the appended claims.

What is claimed is:

1. An apparatus for measuring the filling level of a liquid in a container, comprising a light source, first and second reflecting means, said first reflecting means being positioned in said container, means for floating said second reflecting means in said container, an optical reference path extending between said source and said first reflecting means, an optical measuring path extending between said source and said second reflecting means, said measuring path comprising a non-solid light conductive path extending at least between a fixed position in said container and said second reflecting means, and means for measuring the difference in propagation time of light from said source in said first and second paths.

2. The liquid level measuring means of claim 1, comprising a sealed gas filled nonmagnetic tube means in said container, ring float means surrounding said tube means and adapted to float on a liquid in said container, first magnetic means on said ring float means, follower means in said tube means and having second magnetic means mounted thereon, whereby said follower means is adapted to follow the vertical position of said float means, said second reflecting means being mounted on said follower means, said optical measuring path extending in said tube means from said second reflector means to a fixed position in said tube means.

3. The liquid level measuring means of claim 2, wherein said optical measuring path further comprises optical fiber means extending at least part of the way between said fixed position in said tube means and said light source.

4. The liquid level measuring means of claim 3, wherein said first reflecting means is mounted at a fixed location with respect to said tube means, and said optical reference path comprises optical fiber means extending from said first reflecting means at least part of the way to said light source.

5. The liquid level measuring means of claim 2, wherein said first reflecting means is mounted on said follower means on a side thereof opposite the side on which said first reflecting means is mounted, said optical reference path extending in said tube means from said first reflecting means to a second fixed position in said tube means spaced from said first mentioned position.

6. The liquid level measuring apparatus of claim 5, wherein said tube means comprises a U-shaped tube with a pair of vertical arms, said follower means being positioned in one of said arms, said optical reference path extending from the top of said one arm to a top of said follower means, said optical measuring path extending from the top of the other of said arms through said tube means to the bottom of said follower means, and comprising mirror means at the bottom of said tube means.

7. The liquid level measuring apparatus of claim 2, wherein said first reflecting means is fixedly mounted in said tube means adjacent said fixed position.

8. The liquid level measuring apparatus of claim 7, wherein said optical reference and measuring paths comprise optical fiber means extending from said first reflecting means and fixed position respectively at least part of the distance to said light source.

9. The liquid level measuring apparatus of claim 8, wherein said tube means comprises a vertically extending tube, and said fixed position is at the bottom of said tube.

10. The liquid level measuring apparatus of claim 9, further comprising Cassegrainian mirror means mounted at the bottom of said tube for forming the portion of said optical measuring path in said tube.

11. The liquid level measuring apparatus of claim 2, wherein each of said optical reference and measuring paths extend substantially solely through gaseous media, said light source being mounted at a fixed position externally of said container.

12. The liquid level measuring apparatus of claim 2, wherein said tube means comprises a vertically extending tube, the bottom of said tube being fixedly mounted at the bottom of said container.

13. The liquid level measuring apparatus of claim 2, wherein said container has a cover, said tube means comprising a vertically extending tube hinged to said cover and extending downwardly in said container.

14. The liquid level measuring apparatus of claim 2, wherein said first magnet means is mounted to direct a magnetic pole of a given polarity toward said tube means, and said second magnet means comprising a pair of vertically spaced apart magnet surfaces facing said first magnet means, said magnet surfaces having the same magnetic polarity as said first magnet pole, whereby said follower means is suspended in said tube means by repulsion.

15. The liquid level measuring apparatus of claim 14, wherein said magnet surfaces on said follower means comprise surfaces of separate ring magnets on said follower means.

16. The liquid level measuring apparatus of claim 2, wherein said optical measuring path further comprises lens means at said fixed point for focusing light in said optical measuring path.

17. The liquid level measuring apparatus of claim 2, wherein at least one of said optical reference and measuring paths comprises light conducting fibers having a transit time substantially independent of the entrance angle of light impinging thereon.

18. The liquid level measuring apparatus of claim 2, further comprising means for measuring bulging of said container, and means responsive to said measurement of bulging for compensating said difference measurement.

19. A method for measuring the liquid level in a container, comprising directing light from a source through a first optical path to a first reflector means in said container and detecting light that has passed through said first light path after it has been reflected from said first reflector means, directing light from said source through a second optical path to a second reflector that is vertically movable with respect to the liquid level in said container, whereby said second path extends through a non-solid light conductor region at least adjacent said second reflector, detecting light that has passed through said second light path after it has been reflected from said second reflector, and detecting the time difference in the propagation of light in said first and second paths from said source to the respective reflector and returned through the respective optical path.

* * * * *